May 9, 1961 R. E. MILLER 2,983,555
BALL STUD BEARING ASSEMBLY
Filed Sept. 25, 1959 2 Sheets-Sheet 1
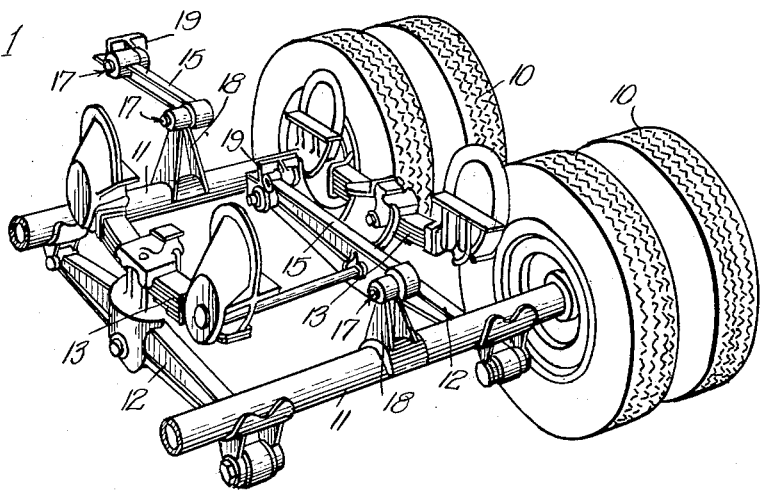
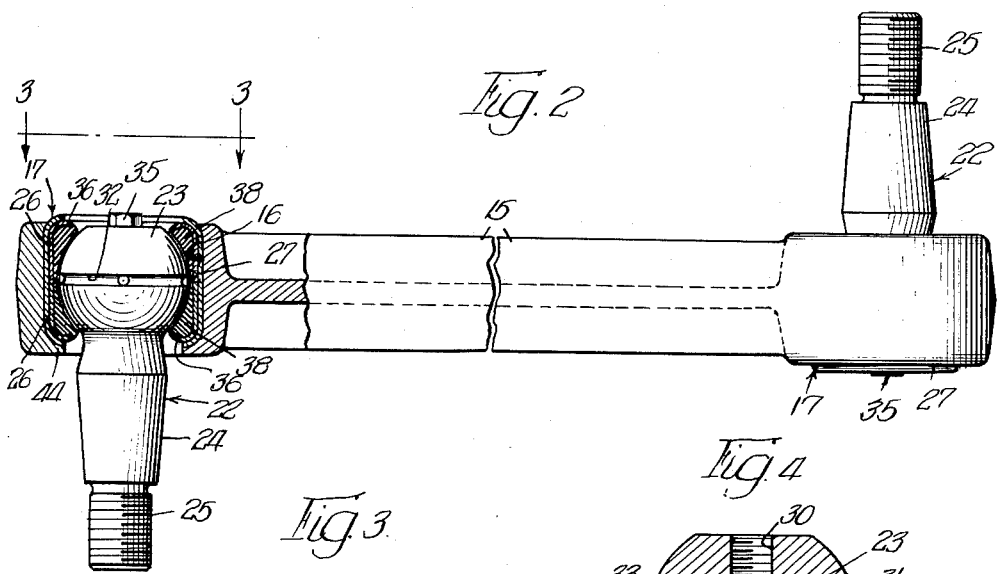
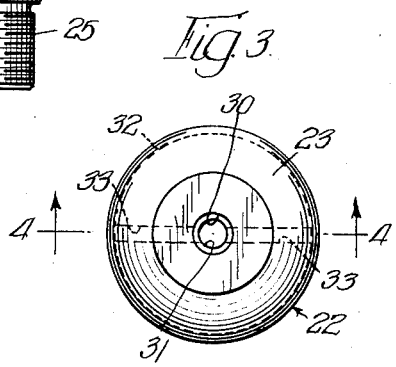
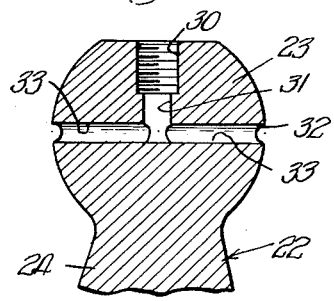
INVENTOR.
R. Earl Miller,
BY
Cromwell, Greist & Warden
ATTYS.

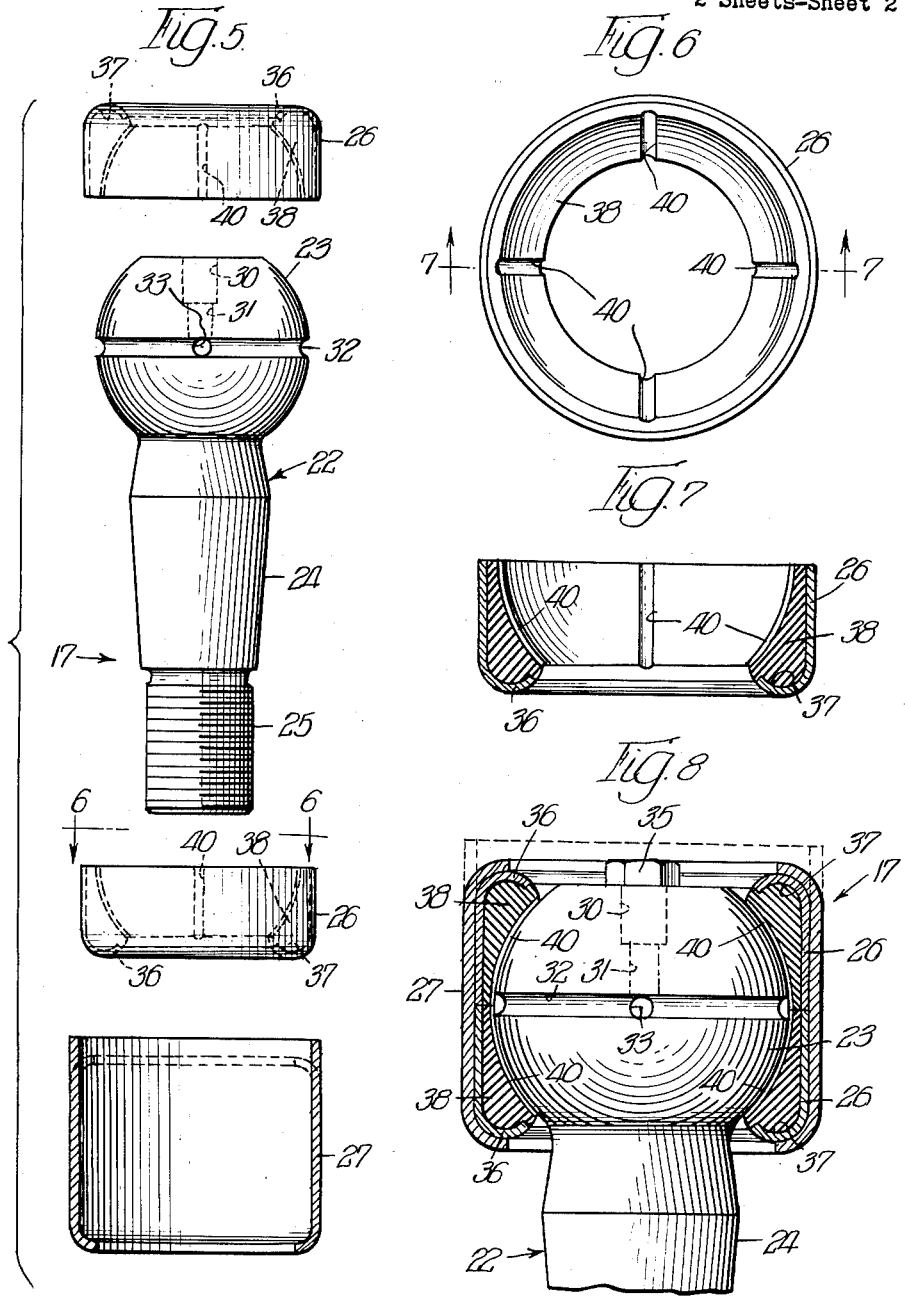

United States Patent Office 2,983,555
Patented May 9, 1961

2,983,555
BALL STUD BEARING ASSEMBLY
R. Earl Miller, Albuquerque, N. Mex., assignor to Hendrickson Mfg. Co., Lyons, Ill., a corporation of Illinois
Filed Sept. 25, 1959, Ser. No. 842,322
6 Claims. (Cl. 308—72)

The present invention relates to a ball stud bearing assembly and, particularly, to such an assembly for use in forming connections in the eyes on the ends of torque rods used, for example, in tandem axle suspensions for trucks.

Ball stud bearing assemblies have been used in tandem axle suspension units for interconnecting the ends of torque rods to adjacent parts such as the axle housings and frame members. It is highly desirable that these ball stud bearing assemblies give extended trouble-free service and require no lubrication in service, particularly where rubber bushings and rubber suspensions are used in the tandem axle assemblies since these require no lubrication. These requirements pose a problem since the ball stud bearing assemblies must be strong and wear resistant and still remain lubricated. Metal ball stud bearing assemblies have been used but are relatively expensive and do not lend themselves to one-time lubrication. The present invention solves this problem through the development of a ball stud bearing assembly utilizing non-metallic bearing material, which assembly is economical to produce, rugged and durable, and requires no lubrication in service.

It is an important object of the invention to provide a new and improved ball stud bearing assembly for use with torque rods wherein the ball end portion of a ball stud is confined for universal movement within non-metallic bearing material.

Another object of the invention is to provide a new and improved ball stud bearing assembly of the character described wherein means are provided for one-time lubrication of the universal connection.

A more detailed object of the invention is to provide a new and improved ball stud assembly for use with torque rods of the character described wherein the ball end portion of a ball stud is confined between a pair of cup-shaped members each of which is provided with a bearing liner formed of fibrous material impregnated with a thermal-setting resin and having a substantially hemi-spherical inner surface, wherein the cup-shaped members are retained in embracing bearing engagement with the ball end portion of the ball stud by a cylindrical shell which is fitted over the cup-shaped members and has its opposite ends rolled inwardly into engagement with the base portions thereof, and wherein the inner surfaces of the bearing liners and the outer surface of the ball end portion of the stud are provided with lubricating groove means adapted to a communicate with each other.

Another important object of the invention is to provide a new and improved unitary ball stud bearing assembly of the character described wherein the assembly if damaged or worn may be readily removed as a unit from an eye in the end of a torque rod and replaced by a new assembly.

Another object of the invention is to provide a new and improved ball stud bearing assembly of the character described which is economical to produce, rugged, and which is provided with a one-shot lubrication feature whereby it requires no maintenance.

Certain other objects of the invention, will, in part, be obvious, and will in part appear hereinafter.

For a more complete understanding of the nature and scope of the invention reference may now be had to the accompanying drawings wherein:

Fig. 1 is a perspective view, with certain parts removed, of a tandem wheel-and-axle suspension assembly, illustrating one environmental usage of torque rods in a vehicle assembly;

Fig. 2 is an enlarged, broken plan view, partially in horizontal section, of a torque rod corresponding to the ones illustrated in Fig. 1 and having ball stud bearing assemblies embodying the invention mounted in the eyes formed on the opposite ends of the torque rod;

Fig. 3 is an enlarged end view of the ball stud as viewed on line 3—3 of Fig. 2 with the lubricating passage plug removed;

Fig. 4 is a fragmentary section, with certain parts removed, taken generally on the line 4—4 of Fig. 3;

Fig. 5 is an enlarged exploded view of the parts forming the ball stud bearing assembly shown in Fig. 2;

Fig. 6 is an enlarged view on line 6—6 of Fig. 5 looking into the interior of one of the cup-shaped members of the assembly;

Fig. 7 is a section taken generally on the line 7—7 of Fig. 6; and

Fig. 8 is an enlarged fragmentary section of the completed ball stud bearing assembly the parts of which are shown in an exploded arrangement in Fig. 5.

In Fig. 1 there is shown one commercial form of a tandem wheel-and-axle suspension assembly for a vehicle such as a heavy duty truck, including two sets of dual wheels 10, front and rear axle housings 11, a pair of equalizing beams 12, and two sets of leaf spring units 13 for supporting the frame of the vehicle. Additionally, two torque rods 15, of the type illustrated in greater detail in Fig. 2, are shown in Fig. 1. The ends of the torque rods 15 are each provided with a bore or eye 16 in which is mounted a ball stud bearing assembly, indicated generally by the reference numeral 17, embodying the invention. One ball stud bearing assembly 17 of each torque rod 15 is connected to the upper end of a post-like bracket 18 mounted on one of the axle housings 11 and the other ball stud bearing assembly 17 of each torque rod 15 is connected to a bracket 19 which in turn is adapted to be connected to frame members of the vehicle.

As best illustrated in Figs. 5 and 8, the ball stud bearing assembly 17 includes a ball stud 22, which is characterized by a ball end portion 23, a tapered shank portion 24 and by an externally threaded end portion 25, a pair of metal cups or cup-shaped members 26, and a cylindrical shell 27 formed of metal.

The upper portion (as viewed in Figs. 4, 5 and 8) of the ball end portion 23 of the ball stud 22 is squared or flattened off and is provided with an internally threaded bore 30 which communicates with an elongated lubrication passage 31 which extends substantially to the center of the ball end portion 23. The outer surface of the ball end portion 23 is provided with a circumferential groove 32 which is placed in communication with the passage 31 at the center of the ball end portion 23 by a pair of radially extending passageways 33. After the parts shown in the exploded arrangement of Fig. 5 have been finally assembled, as will be fully described herein, a suitable lubricant is forced through the bore 30, the passage 31, and the passageways 33 into the groove 32 after which a plug 35 (Fig. 8) is tightly threaded into the bore 30. In most cases the lubricant initially forced into the assembly will be sufficient to last for the life of the bearing assembly 17 whereby this assembly 17 may be said to have a one-shot lubrication feature.

Each cup-shaped member 26 (Figs. 6 and 7) is in the form of a cylinder having one end turned arcuately inwardly, as at 36, to define an annular groove 37 which is adapted to aid in supporting a non-metallic bearing liner or insert 38. The bearing liners 38 are formed so that the inner surfaces thereof are substantially hemispherical whereby to provide bearing engagement thereof with the external surface of the ball end portion 23 of the ball stud 22. Preferably, the bearing liners 38 are formed of a fibrous material impregnated with a thermal-setting resin which provides a relatively hard, tough, durable plastic-like bearing surface.

The resin impregnated fabric-base bearing inserts 38 may be produced and introduced into the metal cups 26 in several known ways. For example, nylon fabric or cotton fabric may be run through a known resin-base impregnating bath, e.g. phenol formaldehyde resin in the A-stage (or resol-stage) dissolved in a suitable solvent such as acetone and containing additional ingredients such as chlorinated rubber. The impregnated fabric is then wound up in layers on a mandrel to the proper thickness and then the resulting tube is cut into short lengths. These short lengths are then introduced into the metal cups 26 and by use of heat and hydraulic pressure the same are molded into shape and bonded and cured in place. A suitable curing agent or catalyst such as hexamethylene tetramine may be used for this purpose.

The metal cups 26 are prepared for receiving the bearing inserts 38 by first being thoroughly cleaned and degreased and the interiors may be sandblasted if necessary. A bonding cement is then applied to the interior. Bonding cements of the type that are widely used commercially to bond rubber to metal may be used. For example, a cement based on approximately the same composition that is used to impregnate the fabric may be used as a cement for this purpose.

Preferably, the molding die is provided on its outer surface with a series of raised elongated projections whereby to form in the inner surface of the bearing liners 38 a plurality of lubricating grooves 40 which are adapted to communicate with or intersect the circumferential groove 32 on the ball end portion 23 of the ball stud 22 in planes generally normal to the plane of the groove 32.

In assembling the parts of the ball stud bearing assembly 17, one of the cup-shaped members 26 is fitted over the upper half of the ball end portion 23 of the ball stud 22 (as viewed in Fig. 5) and the other cup-shaped member 26 is passed over the threaded end portion 25 and the tapered shank portion 24 of the ball stud 22 and fitted over the lower half of the ball end portion 23 (as viewed in Fig. 5). The adjacent edge portions of the cup-shaped members 26 and the bearing liners 38 associated therewith are adapted to be disposed flush against one another in abutting engagement whereby the ball end portion 23 is completely confined in bearing engagement with the inner surfaces of the bearing liners 38. If, for some reason, the cup-shaped members 26 do not properly abut against each other during assembly thereof, the non-brittle bearing material of the bearing inserts 38 lends itself to be drawn up or deformed sufficiently for the members 26 to abut against each upon the application of a suitable clamping force on the outer ends of the members 26. This, of course, would not be possible if the bearing inserts were formed of a metallic bearing material.

To retain the two cup-shaped members 26 in abutting engagement and in bearing association with the ball end portion 23 of the ball stud 22, the cylindrical shell 27 is utilized. As shown in Fig. 5, one end of the shell 27 is curved somewhat inwardly for engagement with the arcuately curved portion 36 of one of the cup-shaped members 26 when the shell 27 is embracingly fitted over the two members 26. The opposite end of the shell 27 is then rolled or turned inwardly into engagement with the arcuately curved portion 36 of the other cup-shaped member 26 whereby the two members 26 are rigidly secured between the two inwardly curved end portions of the shell 27.

As previously discussed herein, lubricant is then forced into the assembly 17 through the passage 31 in the ball end portion 23 after which the plug 35 is threaded tightly into the bore 30. Upon universal movement of the ball end portion 23 relative to the cup-shaped members 26, the lubricant will be distributed in a very thin layer between the outer surface of the ball end portion 23 and the inner surfaces of the bearing liners 38 through the passages 33 and the lubricating grooves 32 and 40 formed respectively on the ball end portion 23 and the bearing liners 38.

As best illustrated in the left hand portion of Fig. 2, each eye 16 on the ends of the torque rods 15 is provided at one end with an inwardly curved lip 44. Thus, the ball stud bearing assembly 17 is adapted to be inserted into the eye 16 until the innermost curved end of the shell 27 engages the inwardly curved lip 44. The material forming the torque rod 15 at the opposite end of the eye 16 may then be peened over against the other curved end of the shell 27 whereby to rigidly secure the ball stud bearing assembly 17 within the eye 16 of the torque rod 15. When it is necessary to replace the ball stud bearing assembly 17, the worn or damaged assembly is merely driven out of the eye 16 after which a new ball stud bearing assembly 17 is inserted therein.

It will be understood that certain minor changes may be made in the construction or arrangement of the ball stud bearing assembly disclosed herein without departing from the spirit and scope of the invention as defined in the appended claims.

I claim:

1. A ball stud bearing assembly for use in forming connections in the eyes on the ends of torque rods and the like comprising, a ball stud having a ball end portion, lubricant reservoir means within said ball end portion, lubricating groove means formed on the outer surface of said ball end portion and in communication with said lubricant reservoir means, a pair of rigid cup-shaped members embracingly fitted over said ball end portion, a pair of bearing liners formed of non-metallic non-resilient bearing material on the interiors of said cup-shaped members, each of said bearing liners having a substantially hemi-spherical inner surface for bearing engagement with said ball end portion, and a cylindrical shell fitted over said pair of cup-shaped members and having its opposite ends turned inwardly whereby to retain said members in bearing engagement with said ball end portion.

2. A ball stud bearing assembly for use in forming connections in the eyes on the ends of torque rods and the like comprising, a ball stud having a ball end portion, lubricating groove means on the outer surface of said ball end portion, a pair of rigid cup-shaped members fitted over said ball end portion with their open edges in abutting engagement, a pair of non-resilient bearing liners formed of a resin impregnated fibrous material bonded to the inner surfaces on said cup-shaped members, each of said bearing liners having a substantially hemi-spherical inner surface for bearing engagement with said ball end portion, lubricating groove means formed on the inner surfaces of said bearing liners and disposed generally at right angles to said lubricating groove means on the outer surface of said ball end portion, and a cylindrical shell fitted over said pair of cup-shaped members and having its opposite ends turned inwardly into engagement with the base portions of said cup-shaped members whereby to retain the open ends of said members in abutting engagement, said shell being adapted to be mounted in an eye formed on the end of a torque rod.

3. A ball stud bearing assembly for use in forming connections in the eyes on the ends of torque rods and the like comprising, a ball stud having a ball end portion which is characterized by a circumferential lubricating groove disposed in a plane normal to the longitudinal axis of the ball stud, a normally plugged, radially extending bore for introducing lubricant to the center of the ball end portion, and by at least one lubricating passage extending between the center of the ball end portion and the circumferentially extending lubricating groove, a pair of rigid cup-shaped members fitted over said ball end portion with their open edges in abutting engagement, a pair of non-resilient bearing liners formed of non-metallic bearing material bonded to the inner surfaces of said cup-shaped members, each of said bearing liners having a substantially hemi-spherical inner surface for bearing engagement with said ball end portion, and a cylindrical shell fitted over said pair of cup-shaped members and having its opposite ends turned inwardly into engagement with the base portions of said cup-shaped members whereby to retain the open ends of said members in abutting engagement.

4. A ball stud bearing assembly for use in forming connections in the eyes on the ends of torque rods and the like comprising, a ball stud having a ball end portion, lubricant reservoir means within said ball end portion, lubricating groove means formed on the outer surface of said ball end portion and in communication with said lubricant reservoir means, a pair of cup-shaped members fitted over said ball end portion with their open edges in abutting engagement, a pair of non-resilient bearing liners formed of a fibrous material impregnated with a thermal-setting resin bonded to the interiors of said cup-shaped members, each of said bearing liners having a substantially hemi-spherical inner surface for bearing engagement with said ball end portion, and a cylindrical shell fitted over said pair of cup-shaped members and having its opposite ends turned inwardly into engagement with the base portions of said cup-shaped members whereby to retain the open ends of said members in abutting engagement, said shell being adapted to be mounted in an eye formed in the end of a torque rod.

5. A ball stud bearing assembly for use in forming connections in the eyes on the ends of torque rods and the like comprising, a ball stud having a ball end portion which is characterized by a circumferential lubricating groove, a normally plugged, radially extending bore for introducing lubricant to the center of the ball end portion, and by at least one lubricating passage extending between the center of the ball end portion and the circumferentially extending lubricating groove, a pair of rigid cup-shaped members embracingly fitted over said ball end portion, a pair of non-resilient bearing liners formed of a resin impregnated fibrous material bonded to the inner surfaces of said cup-shaped members, each of said bearing liners having a substantially hemi-spherical inner surface for bearing engagement with said ball end portion, said liners each being provided on their inner surfaces with at least on lubricating groove adapted to intersect said circumferential lubricating groove on said ball end portion in a plane generally normal to the plane of said circumferential groove, and a cylindrical shell fitted over said pair of cup-shaped members and having its opposite ends rolled inwardly into engagement with the base portions of said cup-shaped members whereby to retain said members in bearing engagement with said ball end portion.

6. A ball stud bearing assembly for use in forming connections in the eyes on the ends of torque rods and the like comprising, a ball stud having a ball end portion which is characterized by a circumferential lubricating groove on the outer surface thereof in a plane normal to the longitudinal axis of the ball stud, a normally plugged, radially extending bore for introducing lubricant to the center of the ball end portion, and by a plurality of lubricating passages extending between the center of the ball end portion and the circumferentially extending lubricating groove, a pair of rigid cup-shaped members embracingly fitted over said ball end portion with their open edges in abutting engagement, a pair of non-resilient bearing liners formed of a fibrous material impregnated with a thermal-setting resin bonded to the inner surfaces of said cup-shaped members, each of said bearing liners having a substantially hemi-spherical inner surface for bearing engagement with said ball end portion, said liners each being provided on their inner surfaces with a plurality of lubricating grooves adapted to intersect said circumferential lubricating groove on said ball end portion in planes generally normal to the plane of said circumferential groove, and a cylindrical shell embracingly fitted over said pair of cup-shaped members and having its opposite ends rolled inwardly into engagement with the base portions of said cup-shaped members whereby to retain the open ends of said members in abutting engagement, said shell being adapted to be mounted in an eye formed on the end of a torque rod.

References Cited in the file of this patent

UNITED STATES PATENTS

| | | |
|---|---|---|
| 2,461,626 | Booth | Feb. 15, 1949 |
| 2,855,232 | Kozak | Oct. 7, 1958 |

FOREIGN PATENTS

| | | |
|---|---|---|
| 779,419 | Great Britain | July 17, 1957 |

UNITED STATES PATENT OFFICE
CERTIFICATE OF CORRECTION

Patent No. 2,983,555                                                May 9, 1961

R. Earl Miller

It is hereby certified that error appears in the above numbered patent requiring correction and that the said Letters Patent should read as corrected below.

Column 1, line 62, strike out "a"; column 6, line 7, for "on" read -- one --.

Signed and sealed this 21st day of November 1961.

(SEAL)
Attest:

ERNEST W. SWIDER                                            DAVID L. LADD
Attesting Officer                                              Commissioner of Patents

USCOMM-DC